Sept. 8, 1936. F. W. PLUMB 2,053,877
MEANS FOR PRODUCING WARP KNIT FABRICS
Filed Jan. 9, 1933 14 Sheets—Sheet 1
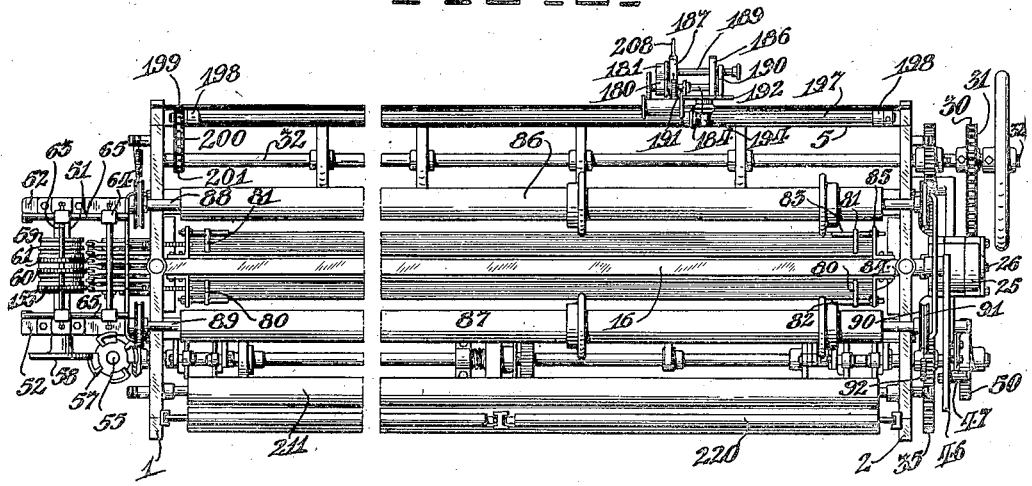
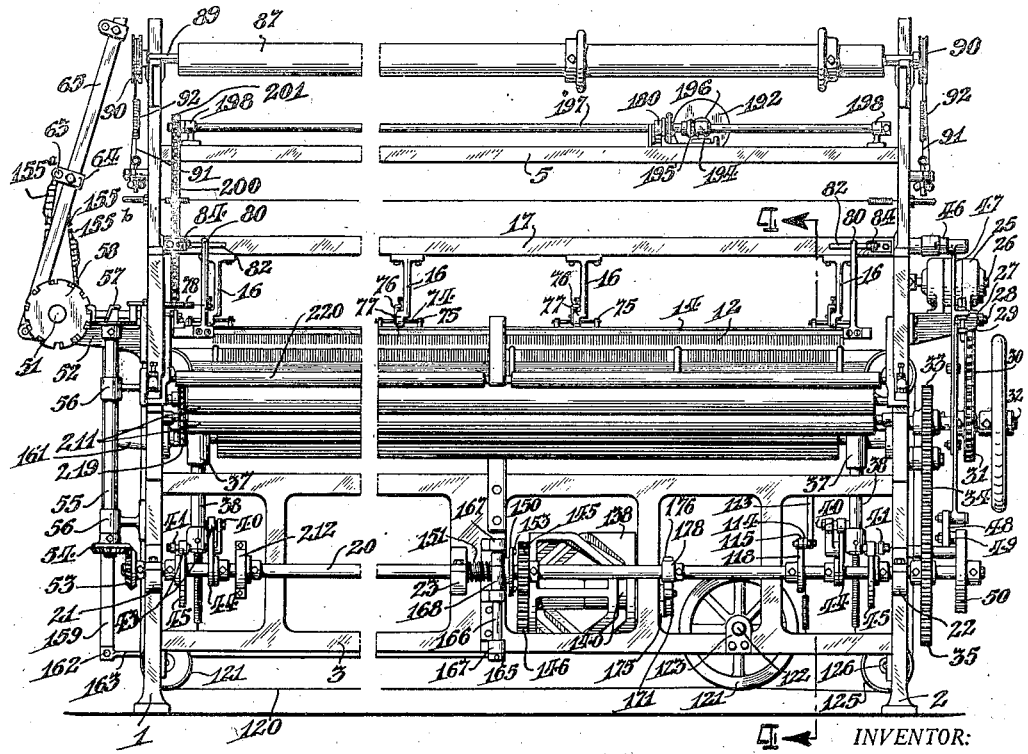
INVENTOR:
Frederic W. Plumb,
BY Alfred E. Ischinger
ATTORNEY.

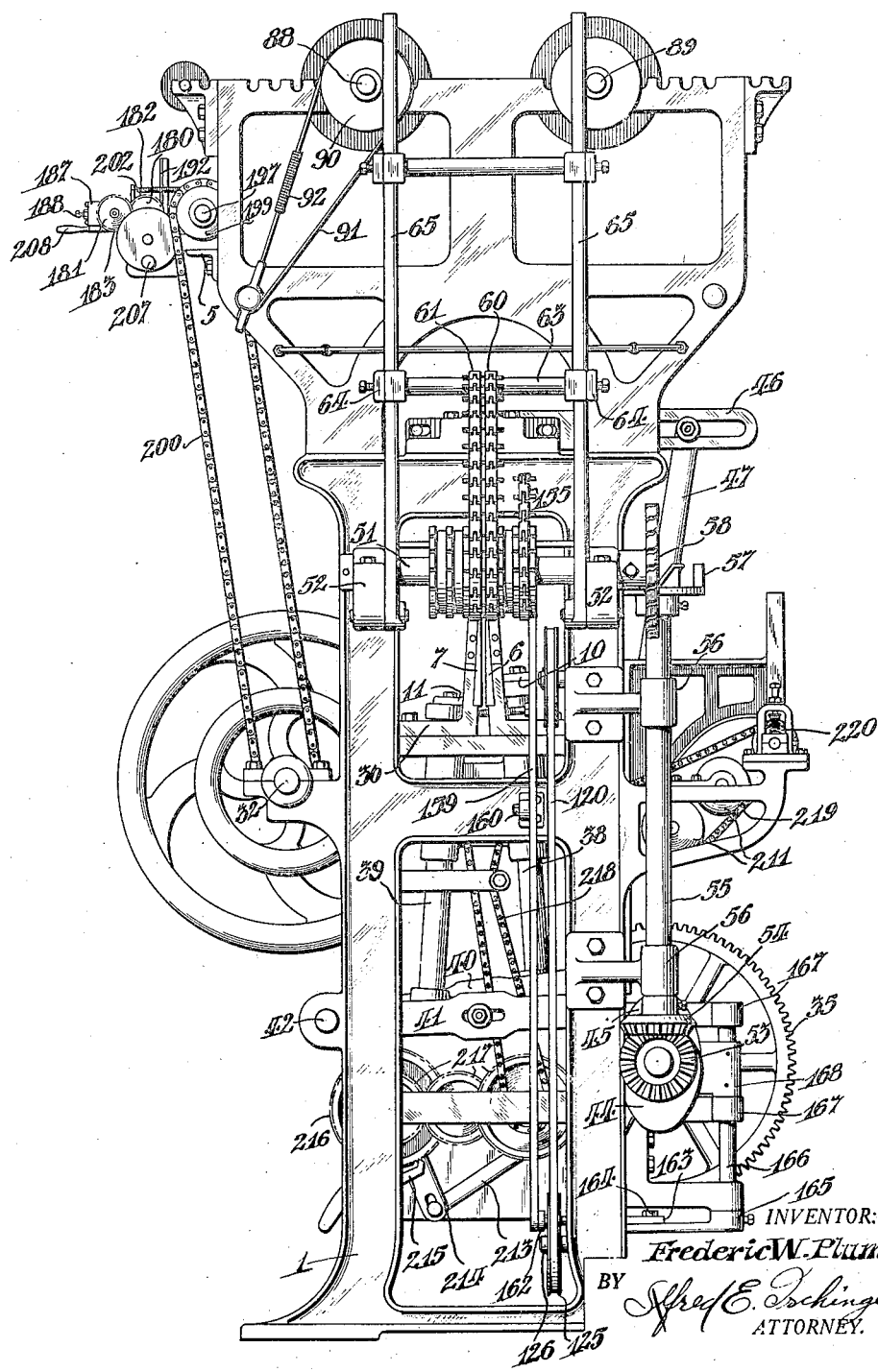

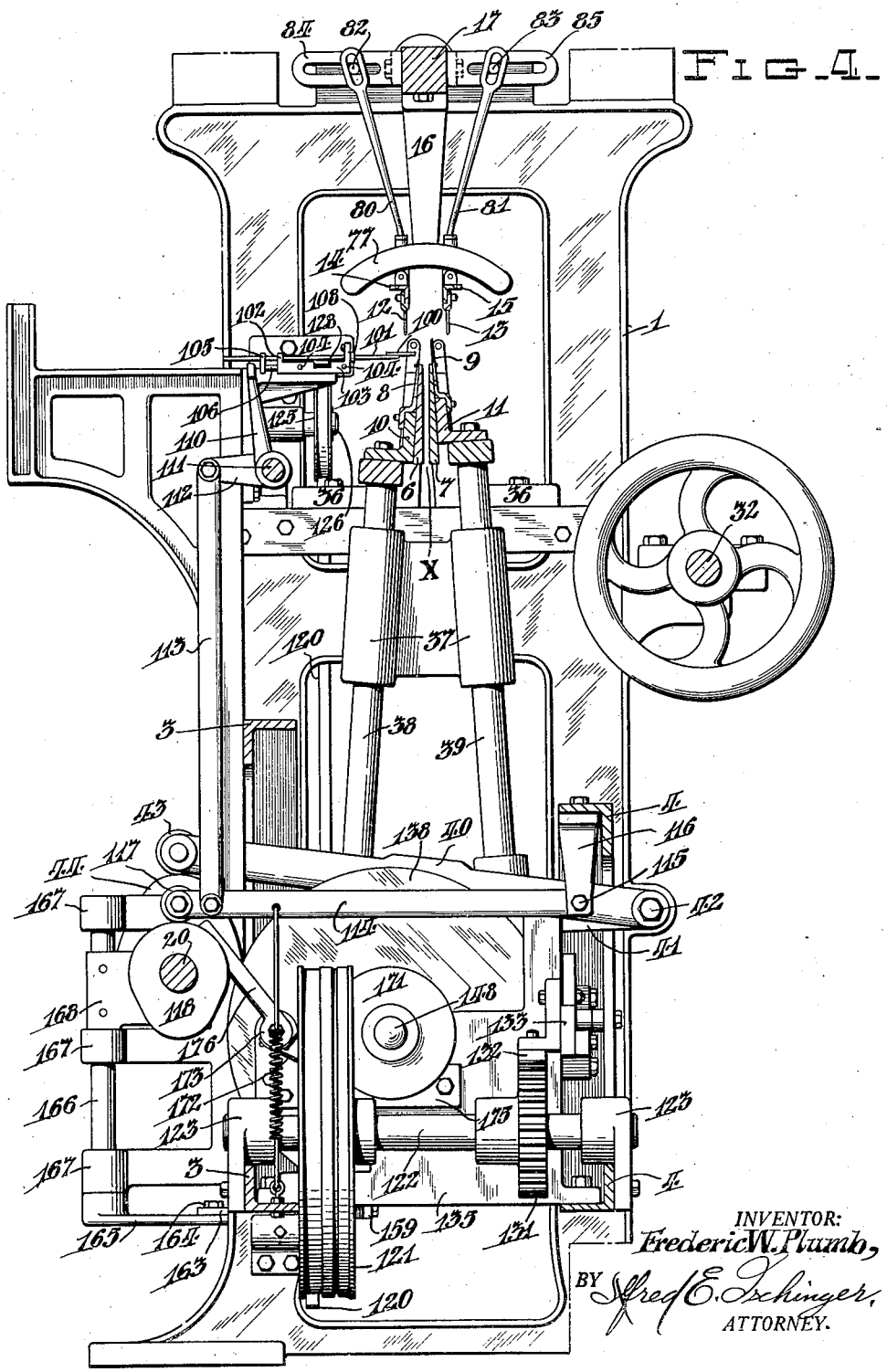

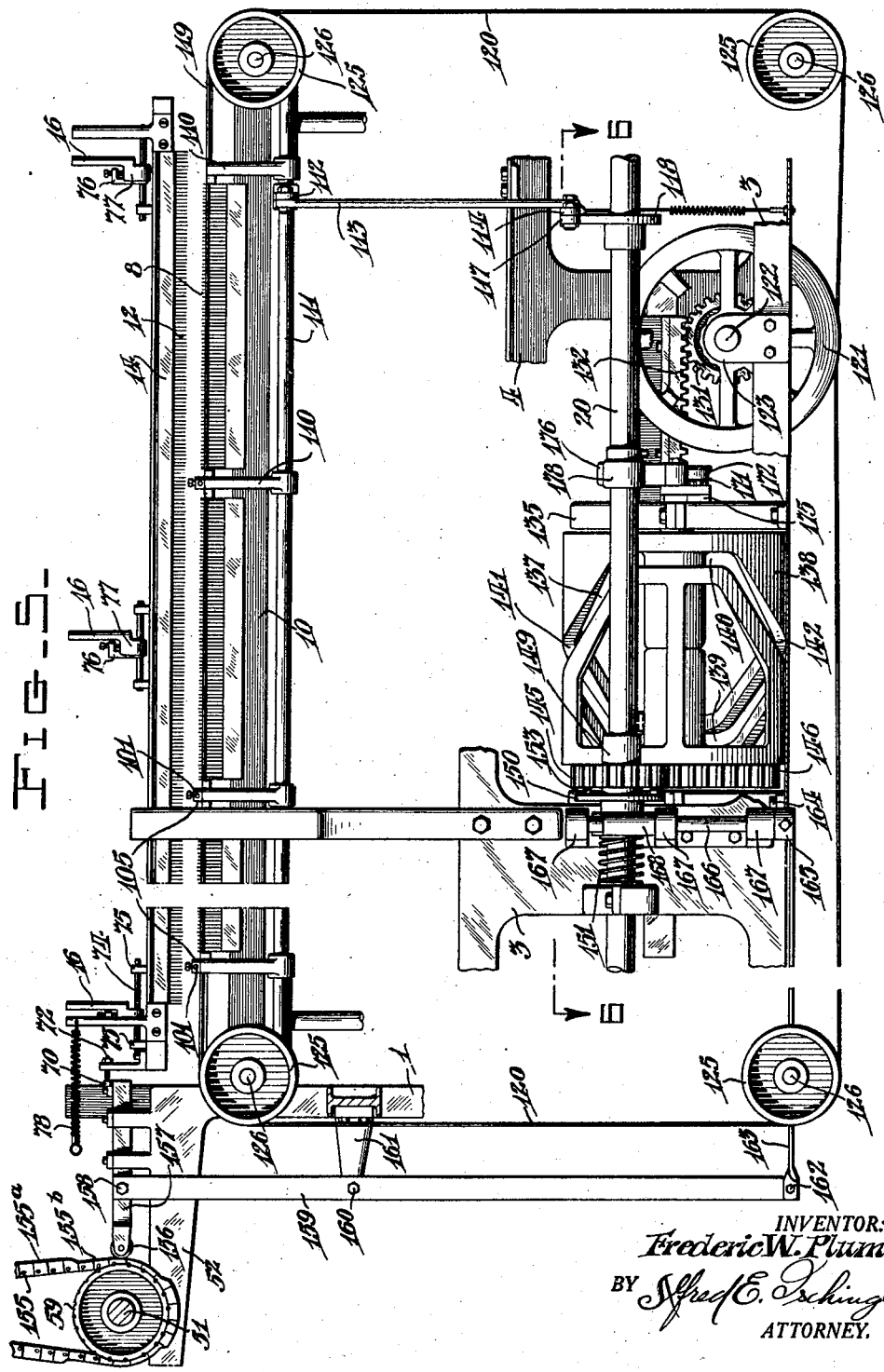

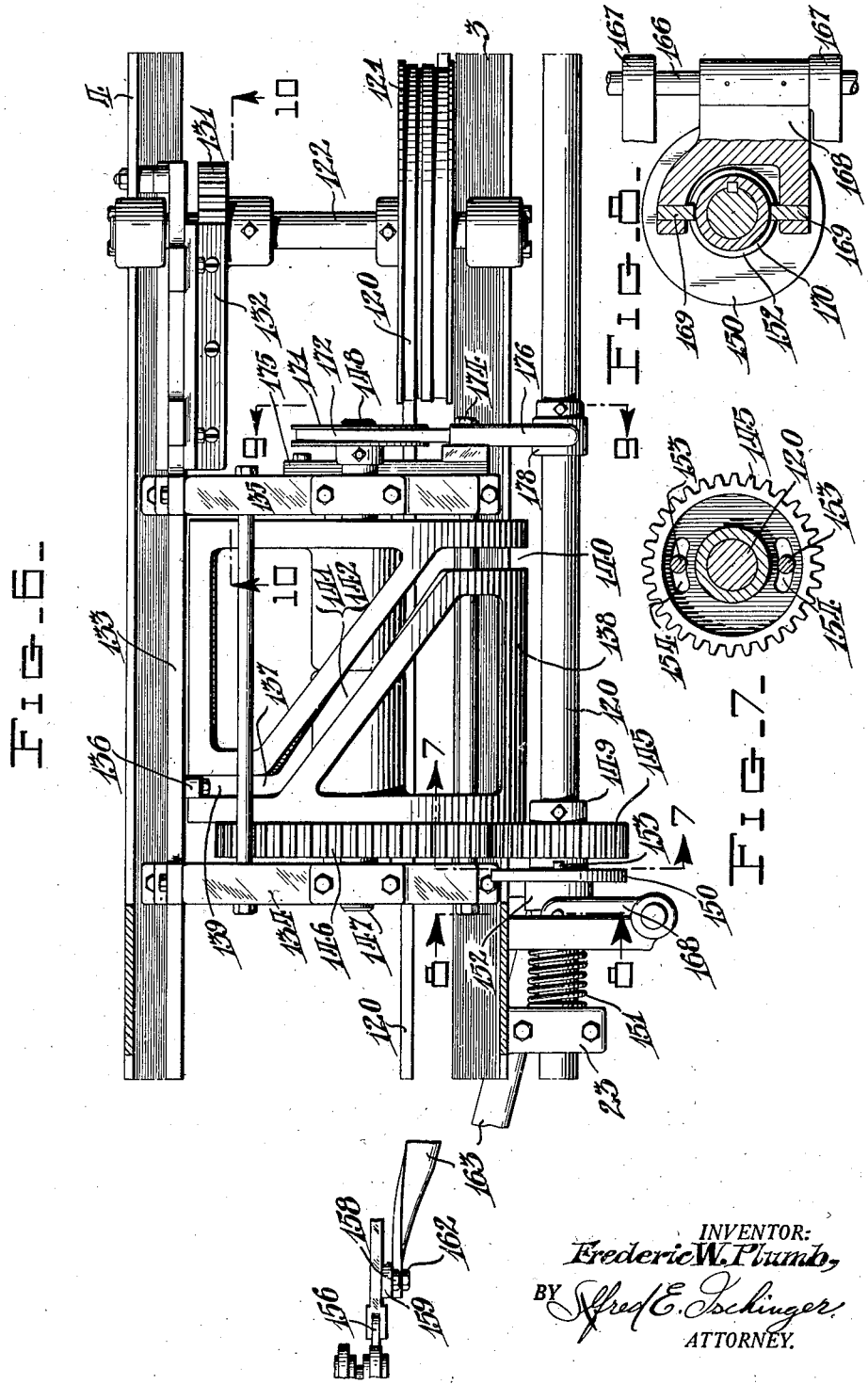

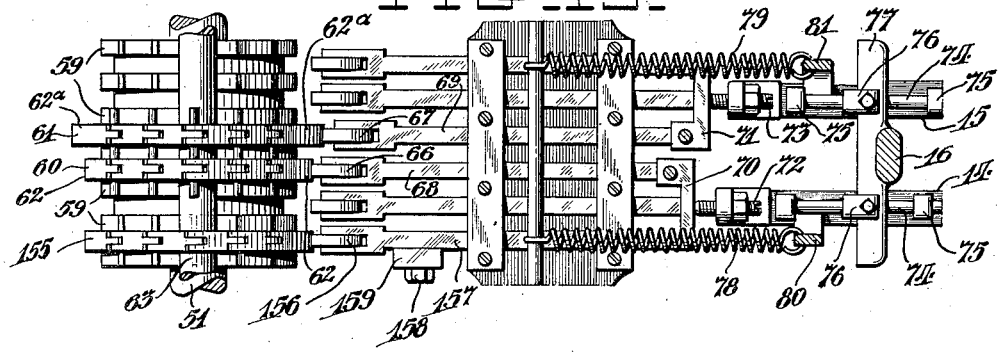

Sept. 8, 1936.    F. W. PLUMB    2,053,877
MEANS FOR PRODUCING WARP KNIT FABRICS
Filed Jan. 9, 1933    14 Sheets-Sheet 8
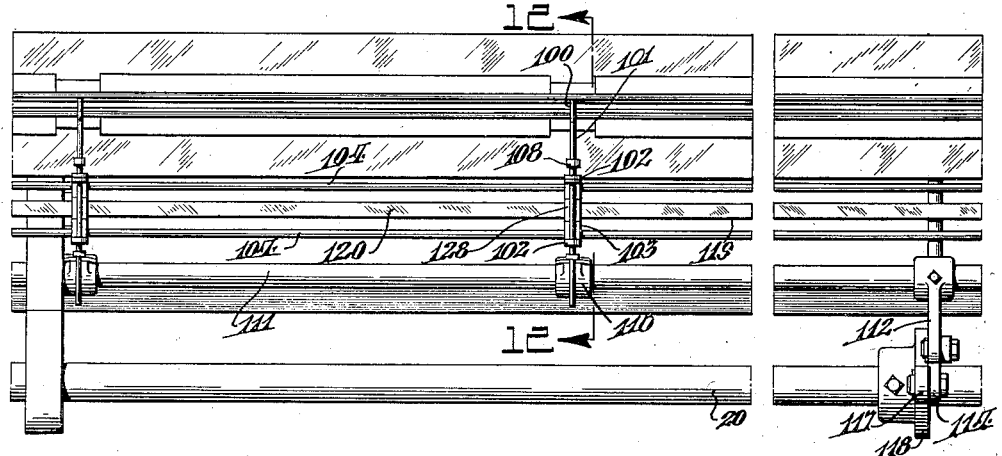
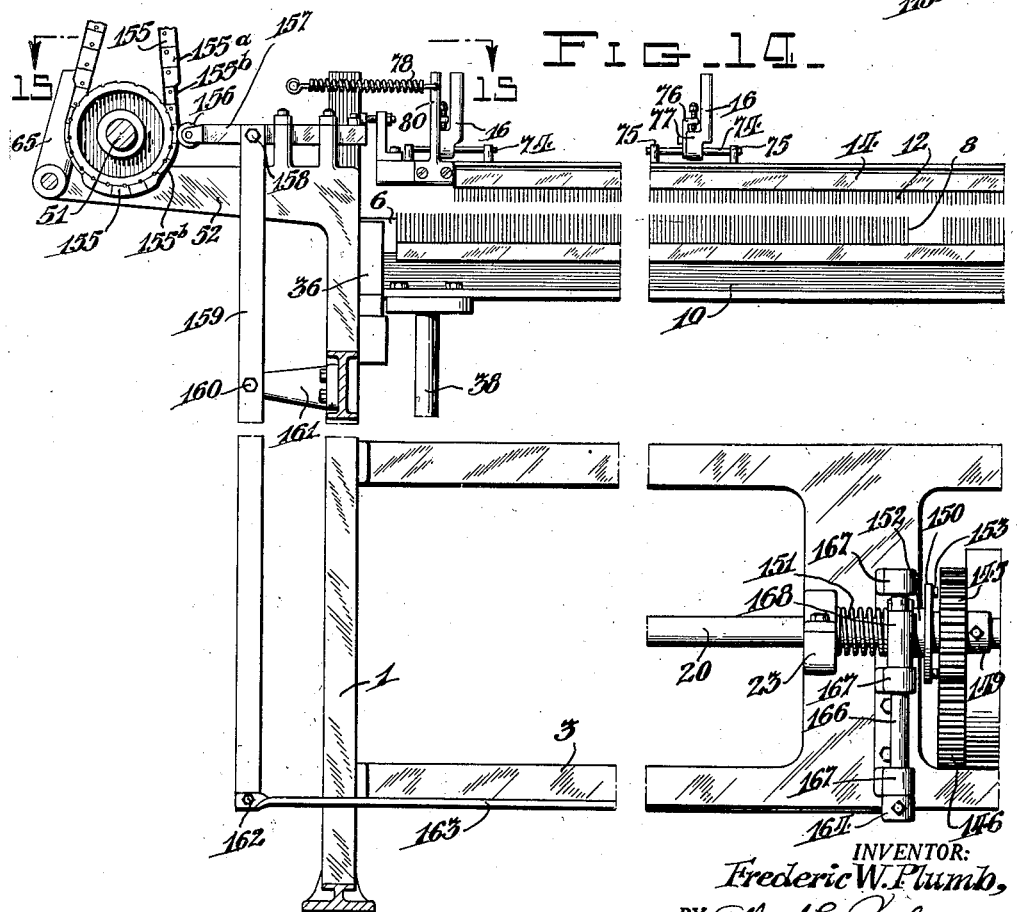
INVENTOR:
Frederic W. Plumb,
BY
ATTORNEY.

INVENTOR:
Frederic W. Plumb,
BY ATTORNEY.

Sept. 8, 1936.   F. W. PLUMB   2,053,877
MEANS FOR PRODUCING WARP KNIT FABRICS
Filed Jan. 9, 1933   14 Sheets-Sheet 10
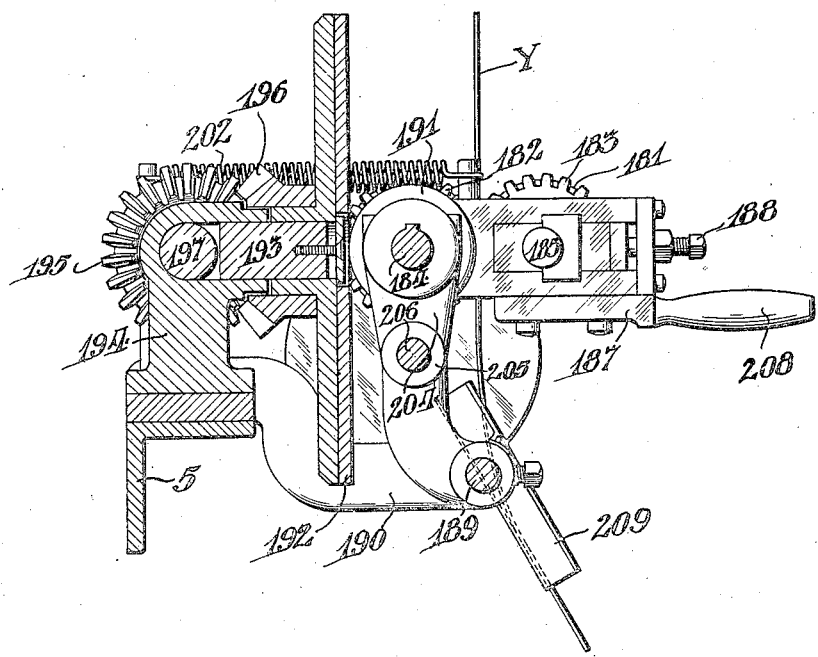
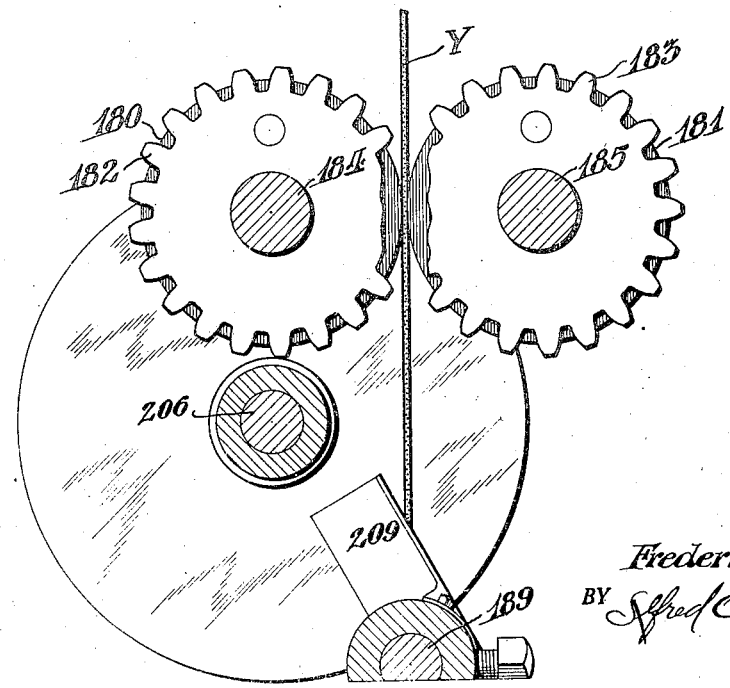
INVENTOR:
Frederic W. Plumb,
BY Alfred E. Ischinger
ATTORNEY.

Sept. 8, 1936.  F. W. PLUMB  2,053,877
MEANS FOR PRODUCING WARP KNIT FABRICS
Filed Jan. 9, 1933  14 Sheets-Sheet 11
FIG. 20.  FIG. 21.  FIG. 22.
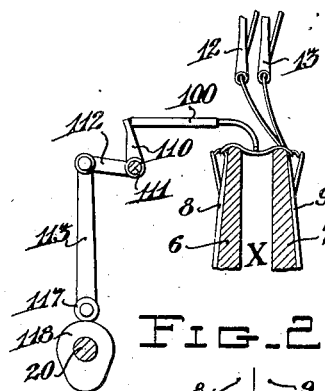
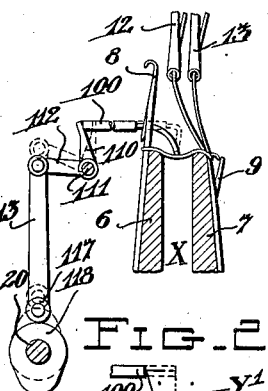
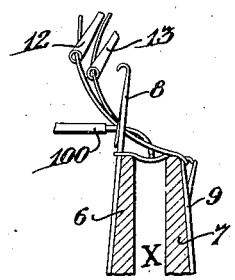
FIG. 20ª.  FIG. 21ª.  FIG. 22ª.
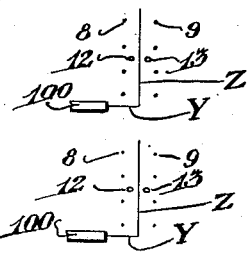
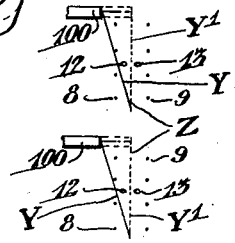
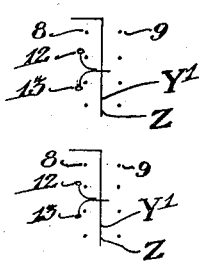
FIG. 23.  FIG. 24.
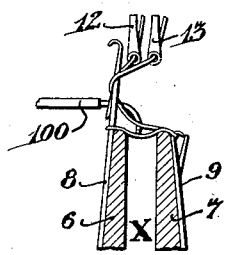
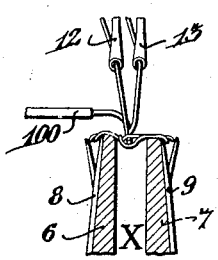
FIG. 23ª.  FIG. 24ª.
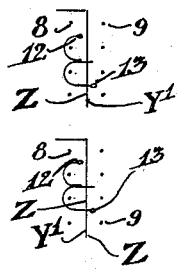
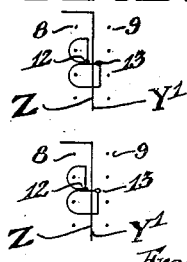
INVENTOR:
Frederic W. Plumb,
BY Alfred E. Ischinger,
ATTORNEY.

Sept. 8, 1936. F. W. PLUMB 2,053,877
MEANS FOR PRODUCING WARP KNIT FABRICS
Filed Jan. 9, 1933 14 Sheets-Sheet 12
FIG. 25.  FIG. 26.  FIG. 27.
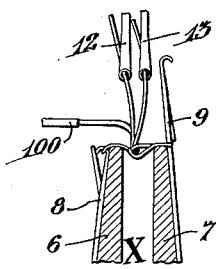 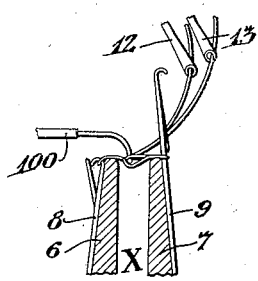 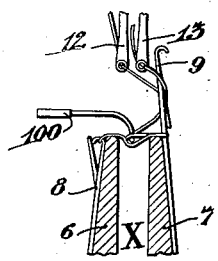
FIG. 25ª.  FIG. 26ª.  FIG. 27ª.
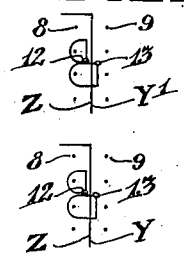 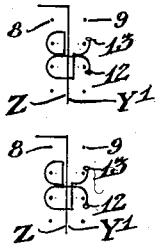 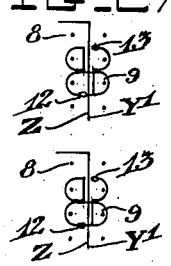
FIG. 28.  FIG. 29.
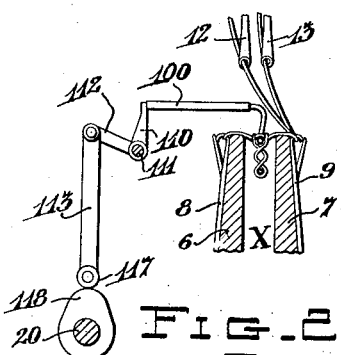 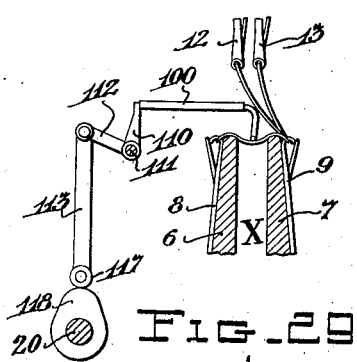
FIG. 28ª.  FIG. 29ª.
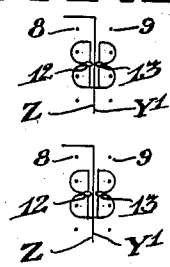
INVENTOR:
Frederic W. Plumb,
BY
ATTORNEY.

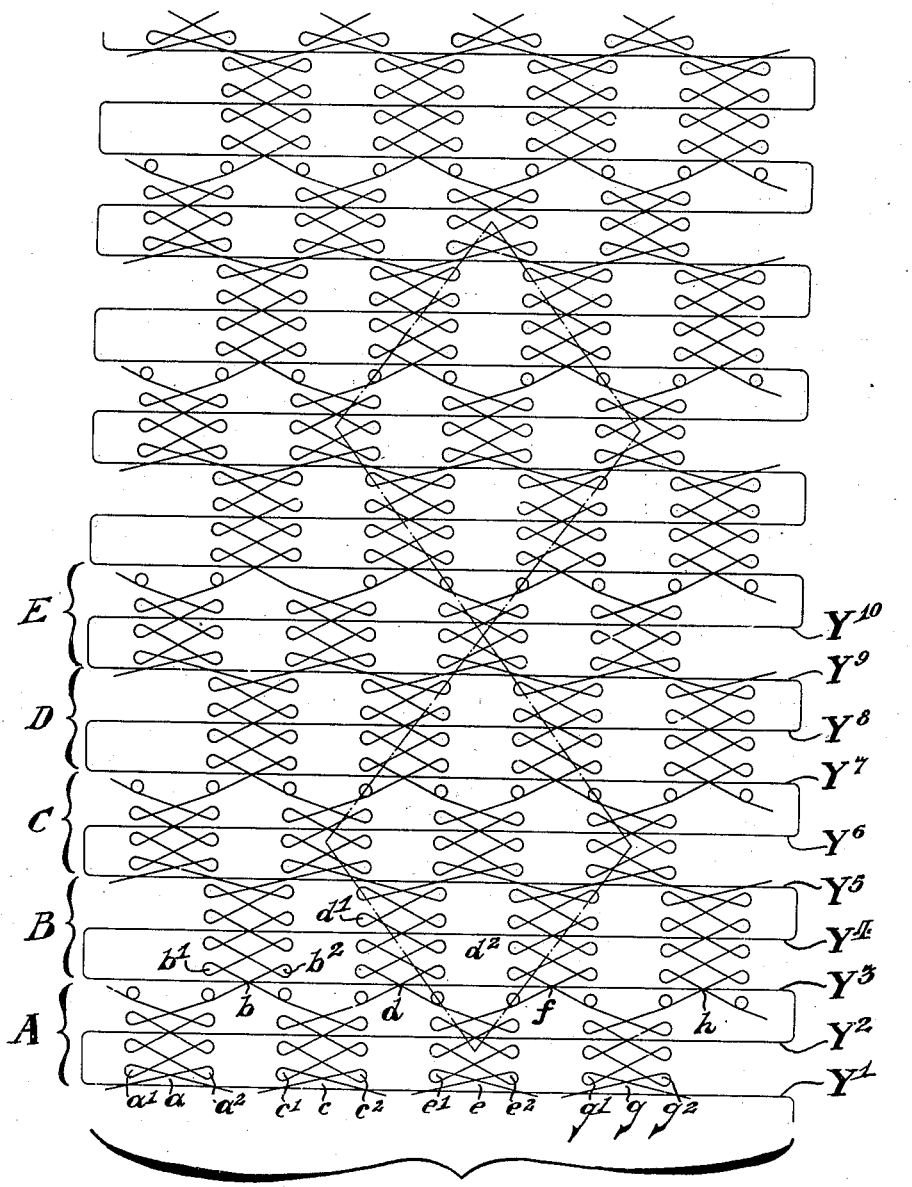

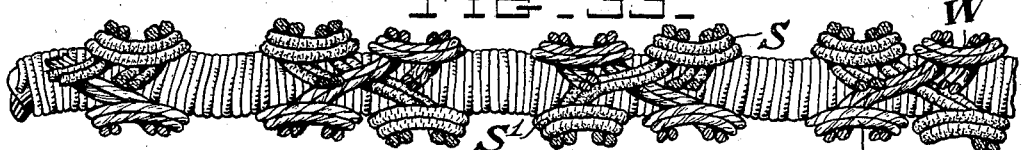
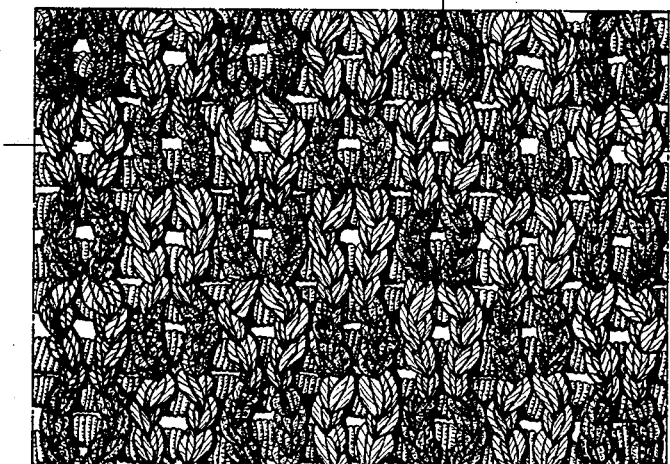
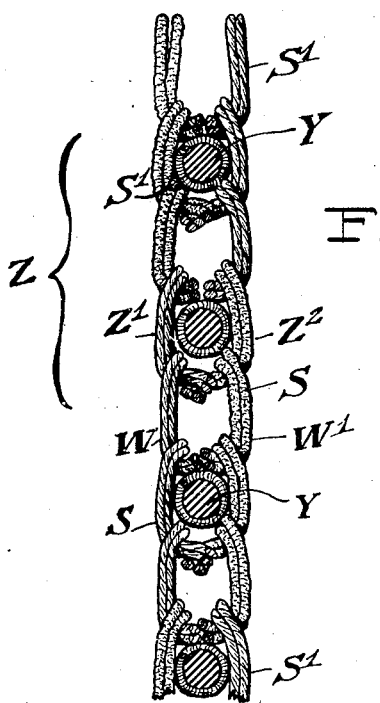

Patented Sept. 8, 1936

2,053,877

UNITED STATES PATENT OFFICE 2,053,877

MEANS FOR PRODUCING WARP KNIT FABRICS

Frederic W. Plumb, West Reading, Pa., assignor to Narrow Fabric Company, West Reading, Pa., a corporation of Pennsylvania Application January 9, 1933, Serial No. 650,756

9 Claims. (Cl. 66—84)

This invention relates to elastic knitted fabrics of the type employed in the manufacture of surgical bandages, girdles, etc., wherein a plurality of rubber strands are incorporated in the fabric in substantially parallel relation to each other and extending generally in a direction coursewise of the fabric.

Prior to the present invention it has been common practice to place and tie the elastic strands on and against one face of the fabric, in a manner giving that particular face of the fabric a corded appearance, usually quite distinct from the opposite face of the fabric which may have the appearance of plain knitted goods or which may be composed of tuck or other fancy stitches depicting some form of design thereon.

Under conditions of use, it is usually the corded face of the fabric that is placed in direct or more or less indirect contact with the skin of the wearer of the garment or supporter composed of the elastic fabric and the tension produced by normal stretching of the fabric under normal conditions of usage causes these cords to be pressed into the skin, frequently causing irritation and discomfort to the wearer.

The object of the present invention is to provide an elastic fabric wherein the rubber strands or threads will be incorporated within the fabric, intermediate the opposite faces thereof. In accordance with the principles of the present invention, the opposite faces of the fabric will be of a generally smooth character and of substantially the same appearance and construction throughout, whereby the fabric will be of a reversible nature, permitting the use of either face of the fabric in direct or indirect contact with the skin without causing irritation or discomfort to the wearer.

Obviously, the opposite faces of the improved fabric may be plain in appearance or they may include designs of similar characters respectively without sacrificing the advantages obtained by the generally smooth surface of the fabric.

The present invention more particularly concerns an improved knitting machine of the flat type embodying the use of two independent banks of needles disposed and operated in planes substantially parallel to each other. The improved machine further includes a novel mechanism for laying the elastic threads in the center of the fabric as the fabric is being knit by coordinate operation of the said two-banks of needles.

The construction and operation of the improved machine will be more fully disclosed hereinafter, reference being had to the accompanying drawings; of which:

Fig. 1 is a front elevation illustrating a general assemblage of elements of which the machine may be composed;

Fig. 2 is a plan view of the machine illustrated in Fig. 1;

Fig. 3 is a left end elevation, drawn to an enlarged scale, of the machine shown in Figs. 1 and 2;

Fig. 4 is a longitudinal sectional elevation taken on the line 4—4, Fig. 1;

Fig. 5 is a front elevation, partly in section, illustrating, in detail, the mechanism employed for controlling the laying of the elastic threads in the center of the fabric;

Figure 9:
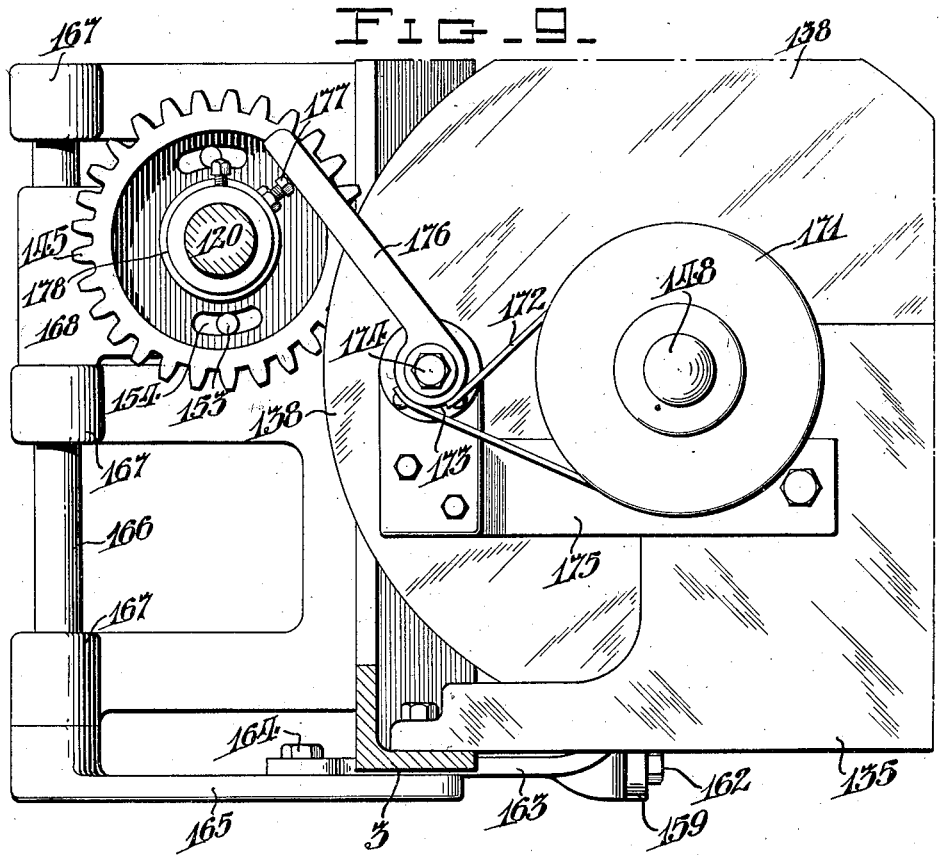
Figure 10:
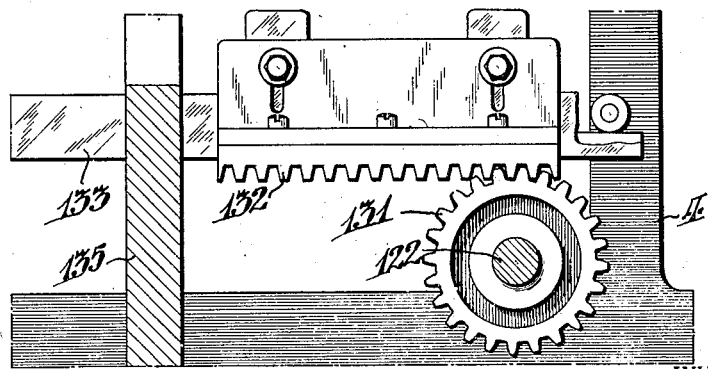
Figure 16:
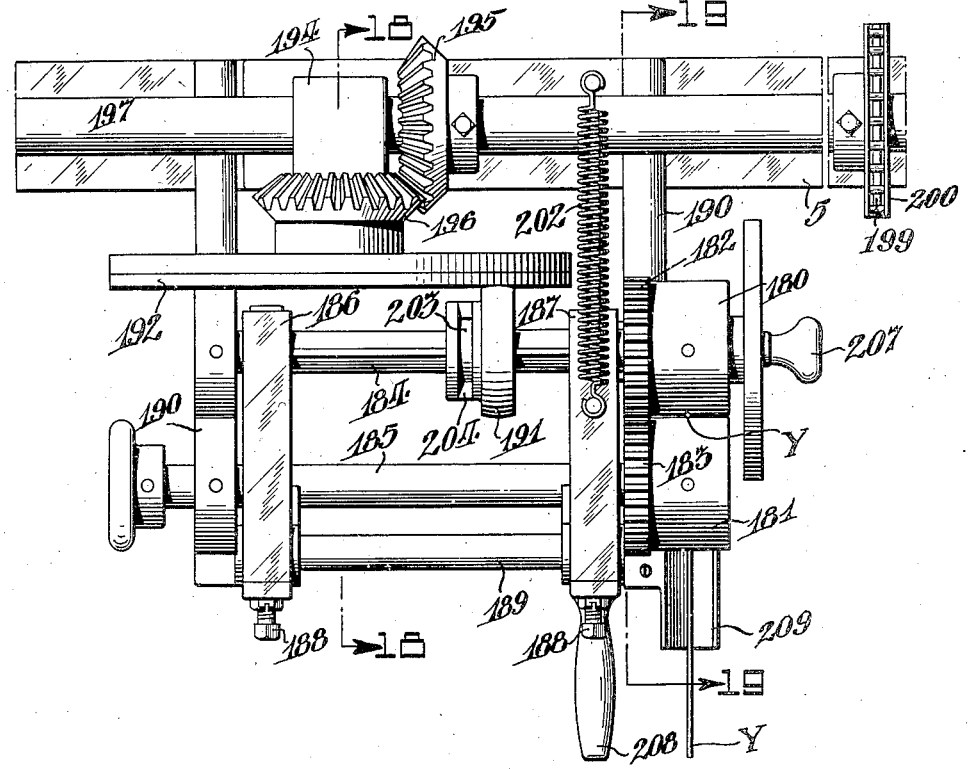
Figure 17:
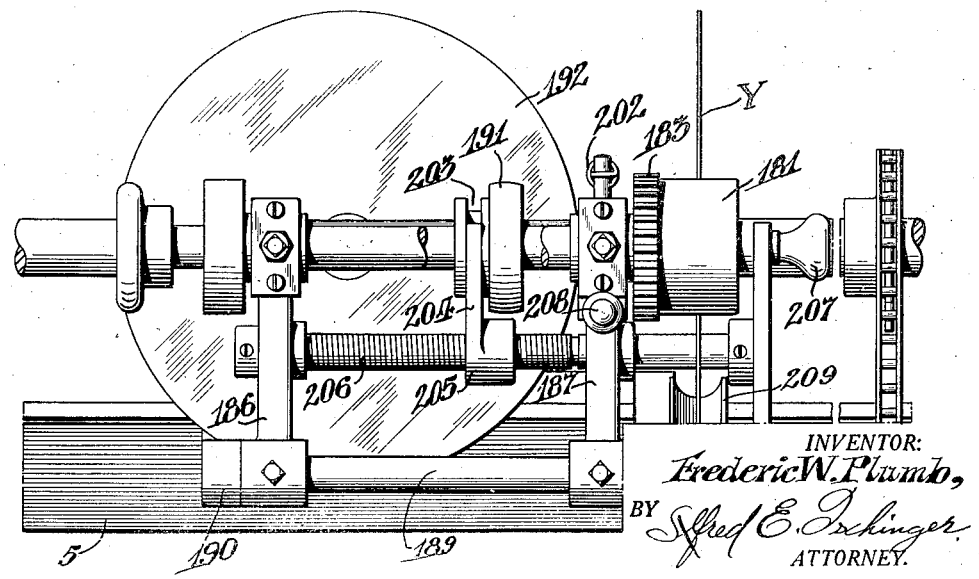

Fig. 6 constitutes a sectional plan view taken on the line 6—6, Fig. 5;

Fig. 7 is a sectional elevation taken on the line 7—7, Fig. 6;

Fig. 8 is a sectional elevation taken on the line 8—8, Fig. 6;

Fig. 9 is a sectional elevation taken on the line 9—9, Fig. 6;

Fig. 10 is a sectional elevation taken on the line 10—10, Fig. 6;

Fig. 11 is a plan view illustrating the relation between a pair of heads operable across adjacently disposed groups, respectively, of the needles of the machine, for laying the elastic threads in the fabric, under control of the mechanisms shown in Figs. 5 to 10 inclusive;

Fig. 12 is a sectional elevation taken on the line 12—12, Fig. 11;

Fig. 13 is an enlarged plan view of one of the heads shown in Fig. 11, being partly in section as taken on the line 13—13, Fig. 12;

Fig. 14 is a front elevation of mechanism arranged to shog the foundation thread carriers laterally with respect to the banks of needles; and the mechanism for controlling the thread-laying movements of the heads shown in Fig. 11;

Fig. 15 is a plan view partly in section as taken on the line 15—15, Fig. 14;

Fig. 16 is an enlarged plan view of mechanism provided to remove all tension from the elastic threads as the same are laid in the fabric during the knitting thereof;

Fig. 17 is a front elevation of the mechanism shown in Fig. 16;

Fig. 18 is a sectional elevation taken on the line 18—18, Fig. 16;

Fig. 19 is a sectional elevation taken on the line 19—19, Fig. 16;

Figs. 20 to 29 inclusive and 20a to 29a inclusive diagrammatically illustrate one cycle involving the laying of an elastic thread and the knitting of said thread into the fabric;

Fig. 30 diagrammatically illustrates a number of successive cycles illustrated in Figs. 20 to 29 and 20a to 29a inclusive;

Fig. 31 is an enlarged face view of the fabric; and

Figs. 32 and 33 are respectively walewise and coursewise sectional views of the fabric, illustrating the rubber strands disposed in the center thereof, said sections being taken on the lines 32—32 and 33—33, respectively, on Fig. 31.

The machine in general comprises a left side or end frame 1 and a corresponding right side or end frame 2 as clearly shown in Figs. 1 and 2. The side frames 1 and 2 are spaced apart and rigidly connected by a transversely extending front frame 3 and a corresponding transversely extending back frame 4, see Figs. 4, 5 and 6, each disposed adjacent and rigidly secured at its opposite ends to the lower portions of the side frames 1 and 2 respectively. The upper portions of the side frames 1 and 2 are spaced and rigidly connected by one or more transverse stringers 5.

Extending transversely of the machine between, and rigidly connected at their opposite ends to, the side frames 1 and 2 are two parallel substantially vertical work plates 6 and 7. The work plates 6 and 7 are spaced apart to provide a slot X through which the fabric passes, downwardly, from the needles as the successive courses of stitches of which the fabric is composed are knit by the substantially parallel banks of needles 8 and 9 carried respectively on and by needle bars 10 and 11, which operate against the outer opposite faces of the work plates 6 and 7 respectively.

Cooperating with the banks of needles 8 and 9 are two series of fingers 12 and 13, which together preferably include one finger for each pair of the needles arranged opposite each other in the bank 8 and the bank 9 respectively, for wrapping individual warp or foundation threads around the needles of the banks 8 and 9 in a manner hereinafter described.

The series of wrapping fingers 12 and 13 are rigidly mounted on transversely extending bars 14 and 15 respectively. The finger bars 14 and 15 are mounted for longitudinal movement, and for lateral relative adjustment on and adjacent the lower ends of rocker arms 16, 16.

The rocker arms 16, 16 are secured to a transversely extending rock shaft 17, by which the wrapping fingers 12 and 13 are adapted to be rocked in planes intersecting and substantially at right angles to the planes of the banks of needles 8 and 9, whereby the fingers 12 and 13 may be passed between predetermined needles of the banks 8 and 9.

The finger-oscillating mechanism working in cooperation with mechanism adapted to produce selective longitudinal movements of the bars 14 and 15, which produces lateral shogging of the fingers 12 and 13 with respect to the needles 8 and 9, causes the warp threads, which form the foundation of the fabric, to be selectively wrapped around the needles of the banks 8 and 9, to produce predetermined stitch formations on opposite faces of the fabric respectively.

The cooperative actions between the needles 8 and 9 and wrapping fingers 12 and 13 are effected by and from a main cam shaft 20, which is rotatably mounted in bearings 21 and 22, carried by the side frames 1 and 2 respectively, and in a bearing 23 secured to the front transverse frame 3. The cam shaft 20 may be continuously rotated from any suitable source of power. In the present instance, the shaft 20 is driven from and by a motor 25, see Figs. 1 and 2, the armature shaft 26 of which is suitably geared to a reduction mechanism of any desired construction enclosed in a transmission box 27. From the transmission box 27 extends a shaft 28, on the outer end of which is secured a sprocket 29. The sprocket 29 is operatively connected by a chain 30 to a sprocket 31 secured to a transversely extending countershaft 32. Through a train of gears 33, 34, 35, the countershaft 32 is operatively connected to and drives the cam shaft 20.

The needle bars 10 and 11 are guided for vertical movement in brackets 36 secured to the side frames 1 and 2, which latter may also function as supports for the work plates 6 and 7.

At each of the opposite ends of each of the needle bars 10 and 11 is an operating rod therefor, the operating rods for the needle bar 10 being illustrated at 38, 38, while the operating rods for the needle bar 11 are illustrated at 39. The operating rods 38 and 39 are slidably mounted in bearings 37 secured to the said side frames 1 and 2 respectively The rods 38, 38 of the needle bar 10 are operatively attached, at their lower ends, to levers or arms 40, 40, while the rods 39, 39 of the needle bar 11 are operatively connected at their lower ends to arms 41, 41.

The arms 40 and 41 are pivotally connected to the side frames 1 and 2 at fulcrum points 42, 42, the opposite ends of said arms being provided with cam followers 43, 43 which ride the peripheral surfaces of cams 44, 44, and 45, 45 secured to the cam shaft 20 adjacent the side frames 1 and 2 respectively.

The cams 44, 44, through the arms 40, 40, control the operation of the needle bar 10 and the needles 8 thereon, while the cams 45, 45, through the arms 41, 41, control the movements of the needle bar 11 having the needles 9 thereon.

The rocking motion of the transverse bar or shaft 17, which effects the rocking motion of the thread or wrapping fingers 12 and 13, is effected through an arm 46 secured to one end of the transverse rock shaft 17, adjacent the side frame 2. The arm 46 is operatively connected by a link 47 to an arm 48 having a cam follower 49 operatively engaging a cam 50 secured to the cam shaft 20.

Longitudinal movement of the finger bars 14 and 15, for producing lateral shogging of the fingers 12 and 13 respectively carried thereby, is effected by a pattern mechanism illustrated in Figs. 1, 2, 5, 14 and 15. The pattern mechanism comprises a shaft 51 rotatably mounted in brackets 52, 52 secured to and extending laterally from the side frame 1. The shaft 51 is intermittently rotated, from the cam shaft 20, by means of a pair of bevel gears 53 and 54, the first of which is secured to the cam shaft 20 while the second is secured to the lower end of a vertical shaft 55 which is rotatably mounted in bearings 56, 56 secured to the side frame 1.

The upper end of the shaft 55 is provided with an actuating and locking wheel 57, forming one element of a modified "Geneva" movement, the second element of which comprises a wheel 58 secured to the pattern shaft 51 and provided with a series of circumferentially spaced notches with which circumferentially spaced angularly shaped projections or teeth of the actuating wheel 57 cooperate to advance the wheel 58 to the extent of one notch for each tooth in the wheel 57, and to lock the wheel 58 between such advancing movements thereof by the teeth of the wheel 57.

Secured to the pattern shaft 51 is a series of cams or, as in the present instance, a series of sprocket wheels 59, around which pass pattern chains 60 and 61 composed of low links 62 interspersed with high links 62a. The pattern chains 60 and 61 may fit snugly and completely around the circumference of the sprockets 59, 59 to provide, in effect, a continuous cam surfaced pattern drum, as illustrated in Figs. 5 and 14, or the length of the pattern chains may exceed the circumferential measurement of the sprockets 59 and pass upwardly around idler sprockets on a bar 63, or directly around such bar, as illustrated in Fig. 1, the bar 63 being supported by brackets 64, 64 adjustably mounted on arms 65, 65, in the present instance pivotally attached to the outer ends of the brackets 52, 52 respectively.

The pattern chains or drums passing around or secured to the shaft 51 are adapted to include lobes or links of various heights, for engagement with followers 66 and 67 rotatably mounted in slides 68 and 69 respectively, which are slidably mounted in the brackets 52, 52.

The slide 68 is provided with a head 70, while the slide 69 is provided with a corresponding head 71. The heads 70 and 71 are adapted to be engaged by abutment screws 72 and 73 respectively carried by corresponding ends of the finger bars 14 and 15 respectively, as illustrated in Fig. 15.

The finger bars 14 and 15 are supported for longitudinal movement with respect to the rocker arms 16 by means of short bars 74, 74 which are secured at their opposite ends in brackets 75, 75. The brackets 75, 75 are secured to the finger bars 14 and 15. The supporting bars 74, 74 are slidably mounted in bearings 76, 76, which are adjustably carried by and secured to lateral extensions 77, 77 of the rocker arms 16, 16, whereby the finger bars 14 and 15 may be moved toward or away from each other on the arms 16, if desired.

The finger bars 14 and 15 are maintained in resilient contact with the heads 70 and 71 of the slides 68 and 69 respectively, and the slides 68 and 69 are maintained in resilient contact with the pattern chains or drums 60 and 61 respectively, by means of springs 78 and 79 which are respectively connected at their inner ends to arms 80 and 81, see Figs. 14 and 15, which are secured at their lower ends to the finger bars 14 and 15 respectively, while the opposite ends of the springs are connected to any suitable relatively fixed portion of the machine. The upper ends of the arms 80 and 81 are arranged to slide on studs 82 and 83 carried by brackets 84 and 85 secured to and extending laterally from opposite sides of the rock shaft 17. The arms 80 and 81 function to stabilize the finger bars 14 and 15 while permitting longitudinal movement thereof with respect to the rocker arms 16, on which said finger bars are slidably mounted, it being noted that one of the arms 80 or 81 is provided at each of the opposite ends of the finger bars 14 and 15 respectively. However, the actuating springs 78 and 79 are attached to the arms adjacent the side frame 1 only.

The foundation warp threads may be fed to the fingers 12 and 13 from any suitable source, such for example, as warp beams 86 and 87 (see Figs. 1 and 2) carried by suitable shafts 88 and 89 rotatably mounted in the upper ends of the side frames 1 and 2 under control of any suitable braking or tensioning mechanism, such as a brake drum 90, as shown in Figs. 1, 2 and 3, having a brake strap 91 passing around the periphery thereof under tension of a spring 92.

The elastic weft threads are laid in the fabric coursewise thereof in each course or at intervals of any predetermined number of successive courses, by the thread-laying heads 95 illustrated in Figs. 11, 12 and 13. These thread-laying heads 95 are each arranged to traverse a predetermined group of the bank of needles 8 and a corresponding group of the bank of needles 9, which cooperate with the group of needles 8 to form and determine the width of one of a series of similar strips of fabric which may be simultaneously produced on and by the machine.

Each of the heads 95 is provided with a tube 100 through which the elastic thread passes from a suitable feeding means, hereinafter described, to the strip of fabric in the course of production. The tube 100 is secured to one end of a slide 101, which is slidably mounted in vertical extensions 102, 102 of a block or carriage 103. The block or carriage 103 is slidably mounted on and guided by a pair of bars or rods 104, 104 which extend transversely of the machine substantially parallel to and spaced from the work plate 6.

On the outer end of the slide 101 is an adjustable abutment 105, against one side of which bears one end of a retracting plunger 106. The retracting plunger 106 is slidably mounted in a bore formed in the block 103 and is backed up by a retracting spring 107, in said bore, which resiliently maintains the slide 101 and the tube 100 normally in a retracted or outer position, with the inner end of the tube 100 disposed outside the plane of the bank of needles 8. The outward retracting movement of the slide 101 is limited, with respect to the block 103, by a collar 108 which is secured to the slide 101 and arranged to engage the upright 102 in which the slide 101 is slidably mounted.

The inner ends of all the thread-laying tubes 100 are adapted to be simultaneously projected longitudinally from their retracted or outer positions into inner or operative positions wherein the said inner ends of the tubes are disposed in positions substantially in line with and above the upper end of the slot X, formed between the work plates 6 and 7, by means of arms 110 (see Figs. 4, 12) which are disposed in laterally spaced relation to each other on and secured to a transversely extending thread-placing shaft 111.

The placing shaft 111 is rotatably mounted in suitable bearings carried by the side frames 1 and 2 respectively. Secured to the thread-placing shaft 111 is a lever 112 to the outer end of which is pivotally attached one end of a link 113 (see Fig. 4), the opposite end of which is pivotally attached to the outer end of an arm 114 having its opposite end pivotally attached at 115 to a bracket 116 secured to the back transverse frame 4. The said outer end of the arm 114 is provided with a roller or other cam follower 117 adapted to ride the peripheral surface of a cam 118 which is secured to the main cam shaft 20 of the machine.

Rotation of the cam shaft 20 periodically rocks the shaft 111, causing the arms 110 thereon to engage the outer surfaces of the abutments 105 on the tube slides 101, whereby the slides 101 are moved longitudinally and the inner ends of the tubes 100 are projected inwardly to the plane of the work slot X.

In addition to the in and out movements of the tubes 100 and their respective slides 101, the said tubes and slides are arranged to traverse simultaneously and respectively groups of the needles 8—9 which cooperate to produce a number of strips of fabric at one time on the machine. The traversing movement of each tube 100, for the particular strip of fabric being produced by the group of needles with which the tube is cooperatively associated extends from a position beyond the needle at one extreme end of the group, across the entire group, to a position beyond the needle at the extreme opposite end of the group. Upon completing each single traversing movement across the said group of needles, the tube is projected inwardly, as above noted, to align the thread with the plane of the fabric in the slot X, whereupon, the group of needles, so traversed, will be raised to hold the laid elastic thread in a position intermediate the two cooperating groups of needles of the banks 8 and 9 thereof, as will be more fully discussed hereinafter.

The simultaneous traversing of the needle groups by the respective laying tubes 100 is accomplished by the mechanism shown in detail in Figs. 5 and 6 of the drawings.

Each of the tube-carrying blocks or carriages 103 is clamped to an upper horizontal run 119 of a steel tape or band 120, the opposite ends of which encircle and are respectively secured to the periphery of an oscillating drum 121. The drum or wheel 121 is secured to a shaft 122 which is rotatably mounted in bearings 123 respectively carried by the front and rear transverse frames 3 and 4. The tape 120 is supported by and moves in a substantially rectangular course around corner guide rollers 125, 125 which are rotatably mounted on studs 126, respectively, secured to the side frames 1 and 2 respectively.

Each tube-carrying block or carriage 103 is provided with a transversely extending groove 127 (see Fig. 12) in which the band or tape 120 is seated and secured by means of a clamp plate 128 which also is disposed within the groove 127 and held rigidly in contact with the tape 120 therein by means of bolts 130, 130, whereby longitudinal movement, in either direction, of the tape 120, in the upper run 119 thereof, will slide the tube carriages 103, 103 laterally along their guides 104, 104, whereby the thread-laying tubes 100 will be correspondingly moved across the groups of needles respectively served thereby.

Oscillation of the traversing drum 121, for moving the upper run 119 of the traversing tape 120 in opposite directions, is effected through the medium of a traversing pinion 131 (see Figs. 4, 5, 6, 10) which is secured to the traversing shaft 122. The teeth of the traversing pinion 131 intermesh with the teeth of a reciprocable rack 132 which is secured to a horizontally reciprocable bar 133. The bar 133 is slidably mounted in cross frames 134 and 135 which are secured at their opposite sides, respectively, to the transverse front and rear frames 3 and 4.

Rotatably mounted on the slide bar 133 is a roller 136 which is arranged to ride in a cam groove 137 formed in the peripheral surface of a traversing drum 138, said cam groove 137 comprising straight circumferentially extending dwell portions 139 and 140, adjacent the opposite ends of the drum respectively, and connecting at their opposite ends with angularly or spirally disposed portions 141 and 142 of the cam groove, whereby rotation of the cam drum 138 will effect longitudinal reciprocation of the slide bar 133, which, in turn, through the rack 132 and pinion 131, oscillates the shaft 122 and the traversing drum 121 thereon; and whereby longitudinal reciprocation of the tape 120 is effected, for producing the lateral traversing movements, in opposite directions, of the series of traversing blocks or tube carriages 103, 103 which are rigidly attached to the upper run 119 of the tape 120.

The traversing cam drum 138 is adapted to be rotated from the cam shaft 20, in the present instance, through the medium of a pinion 145 which is mounted on the cam shaft 20 and meshes with a gear 146 secured to the traversing cam 138.

The traversing cam 138 is provided with trunnions 147 and 148 rotatably mounted in bearings formed in or carried by the cross frames 134 and 135 respectively, and the ratio of the gears 145 and 146 is such that for each rotation of the cam shaft 20 the traversing cam 138 receives but one-half a revolution.

The pinion 145 (see Figs. 1, 4, 5, 6 and 14) is loosely mounted on the shaft 20 between a thrust collar 149 and a disc 150. The disc 150 is splined to the shaft 20 and arranged to be moved longitudinally thereof for locking the gear 145 to the shaft 20 for rotation therewith. Movement of the disc 150 in this direction is effected by means of a spring 151 encircling the shaft 20 between the bearing 23 and the hub 152 of the disc. The disc is provided with pins 153, 153 which are arranged to enter segmental slots 154, 154 (Fig. 7) respectively formed in the gear 145, whereby the gear and the disc may be locked together for rotation as a unit.

The traversing clutch formed by the gear 145 and disc 150 is adapted to be controlled by a cam drum or pattern chain 155 secured to or passing around one of the sprockets 59 secured to the pattern shaft 51, such control element having high portions 155a adapted to release the clutch, by moving the disc 150 away from the gear 145 against the action of the spring 151 and thereby withdrawing the pins 153 from the openings 154 in the gear. The pattern element 155 is also provided with low portions 155b which permit the spring 151 to move the disc 150 toward the gear 145, permitting the pins 153 to enter the openings 154 in the gear 145 to lock the two elements of the clutch together for rotating the traversing drum 138.

The clutch 145—150 is operated from the control element 155 by means of a follower 156 engaging the periphery of the control element 155, said follower 156 being rotatably mounted in one end of a slide bar 157 that is slidably mounted in the brackets 52.

Pivotally attached to the slide bar 157, at 158, is one end of a lever 159 which is pivoted, intermediate its ends, at 160, to a bracket 161 secured to the side frame 1. The second end of the lever 159 is pivotally attached, at 162, to one end of a link 163, the opposite end of which is pivotally connected at 164 to the outer end of a control arm 165.

The control arm 165 is secured to the lower end of a vertical shaft 166 which is rotatably mounted in bearings 167 secured to the transverse frame 3. Secured to the shaft 166 is a yoke arm 168, the outer ends of which are provided with pins 169 (Fig. 8) which ride in a peripheral circumferential groove 170 formed in the hub 152 of the disc 150.

During the formation of a predetermined number of stitch courses, determined by the length of the segmental low portion 155b of the control element 155, the clutch 145—150 is engaged and effects rotation of the cam drum 138, whereby the laying tubes 100 are caused to traverse the groups of needles with which they are respectively associated to lay an elastic thread in each of a predetermined number of successive courses knit by said needles.

During the knitting of other courses the clutch 145—150 is disengaged and the tubes 100 remain in an inoperative position during the formation of a predetermined number of successive courses, determined by the circumferential length of the high segmental portions 155a of the control element 155.

In order to prevent circumferential drifting of the cam drum 138 when the clutch 145—150 is first disengaged the trunnion 148 of the cam drum 138 is provided with a flanged brake wheel 171 (Figs. 1, 5, 6, 9), in the peripheral groove of which is fitted a band 172. The opposite ends of the brake band 172 are secured to the periphery of a hub or collar 173 (Fig. 9) which is pivotally mounted on a stud 174. The stud 174 is rigidly secured in a bracket 175 which, in turn, is rigidly attached to the cross frame 135.

Projecting from the hub 173 is an arm 176, the outer end of which is disposed in the circular path of a projection 177 carried by a collar 178 which is rigidly secured to the cam shaft 20, whereby the brake strap 172 will be tightened about the brake wheel 171, momentarily, at each revolution of the shaft 20 which, when the clutch 145—150 is disengaged, will stop rotation of the cam drum 138 against momentum attained by its rotation during operative engagement of the clutch 145—150.

In order to prevent coursewise contraction and consequent wrinkling of the fabric by the elastic weft threads laid therein by the tubes 100 the elastic threads are fed to the laying tubes 100 in a fully, normally contracted state, devoid of any and all tension.

The distensioning of the elastic thread is accomplished by means of mechanism shown in Figs. 1, 2, 16, 17, 18 and 19, which comprises a pair of feed rolls 180 and 181 between which the elastic thread Y passes. The feed rolls 180 and 181 are geared together for one to one rotation, by gears 182 and 183 respectively secured to the rolls 180 and 181. The rolls 180 and 181 are secured to the shafts 184, 185 respectively. The shaft 184 is rotatably mounted, adjacent its opposite ends respectively, in a pair of rocking frames 186 and 187 and the shaft 185 is also rotatably mounted in said rocking frames in parallel relation to the shaft 184. The shaft 185 is arranged for lateral adjustment to and from the shaft 184, for determining the pressure of the bite of the rolls 180 and 181 on the thread Y, by means of adjusting screws 188.

The rocking frames 186 and 187 are each secured to a pivot shaft 189 (Figs. 17 and 18), which is pivotally mounted in a pair of brackets 190, 190 secured to the upper transverse stringer 5.

Intermediate the frames 186 and 187 the shaft 184 has splined thereto a friction pinion 191, the peripheral surface of which is adapted to engage the flat side face of a friction disc 192, which is rotatably mounted on a stud 193 projecting laterally from a bracket 194 secured to the stringer 5.

The disc 192 is driven at a constant rate of speed motion being derived from shaft 32 which has fixed thereon a sprocket wheel 201 transmitting its movement through a chain 200 to a sprocket wheel 199 on a shaft 197 mounted in bearings 198 on one of the stringers 5, a bevel gear 195 fixed on shaft 197 meshing with a similar gear 196 secured to disc 192. In order to obtain the proper rate of feeding of the elastic thread Y by the rolls 180, 181, to remove all tension from the elastic thread Y as it is drawn from the source of supply and fed to a laying tube 100, the peripheral speed of the rolls 180 and 181 is adapted to be regulated as desired. The regulation of the speed of the feed rolls 180—181 is accomplished by changing the relative position of the point of contact between the periphery of the friction pinion 191 and the disc 192 with respect to the center of rotation of the disc 192. For this purpose, the hub of the friction pinion 191 is provided with a groove 203 in which is mounted a forked arm 204. The arm 204 projects upwardly from a nut 205 which is threaded on a screw shaft 206. The screw shaft 206 is rotatably mounted adjacent its opposite ends in the rocking frames 186 and 187. The screw shaft 206 is provided with a crank 207 by means of which it may be rotated to move the nut 205 therealong, thereby moving the pinion 191 across the face of the disc 192. Such movement of the pinion 191 is effected when the frames 186 and 187 are rocked to move the periphery of the friction pinion 191 away from the disc 192 against the action of the spring 202, by means of a handle 208 rigidly attached to the rocking frame 187.

After passing through the feed rolls 180 and 181 the elastic thread Y hands in a free loop in a normally contracted state between a guide trough 209, attached to the rocking frame 187, and a thread eye 210 (Figs. 12, 13) carried by the traversing block or carriage 103 in which the laying tube 100 is operatively mounted.

The fabric, after knitting, passes downwardly through the work slot X and between or around any desired arrangement of take-up rolls, generally illustrated at 211, which may be driven in any suitable manner to apply any desired amount of tension to the fabric in the slot X intermediate the work plates 6 and 7. The driving of the take-up rolls may be accomplished by an eccentric 212, (Fig. 1) which, through a connecting rod 213, may oscillate a pawl-carrying arm 214 arranged to carry and rack a pawl 215, carried by the arm 214, with a ratchet wheel 216 to effect intermittent rotation of the take-up rolls through a train of gearing 217 which may include sprocket chains 218 and 219, whereby the finished sheet or series of strips may be delivered over a delivery roll 220 at the front of the machine.

In order to produce a strip of fabric such as that shown in Figs. 31 and 32, the high and low lobes 155a and 155b are arranged on the clutch control element 155 so that a rubber thread Y is laid in the fabric in alternate courses of the stitches thereof, and the pattern chains 60 and 61 are provided with links of various heights in predetermined relation to each other to shog the finger bars 14 and 15 relative to the needle banks 8 and 9 and relative to each other in a manner hereinafter described.

To produce the effect shown in Fig. 31, the fingers 12 on the finger bar 14 would be divided into groups each containing approximately one-half the number of needles in each group of the bank 8, with a corresponding number of fingers 13 for the needles on the bank 9 and a single laying tube 100 would cooperate to form a strip of fabric of predetermined width.

The fingers 13 on the finger bar 15 would be grouped in numbers corresponding to the number of fingers 12 in the group on the finger bar 14.

The finger bars 14 and 15 normally would be moved into a position wherein the fingers 12 and 13 thereon are in alignment one behind the other, with the aligned fingers 12 and 13 disposed in line with alternate spaces between the needles of each of the banks 8 and 9 thereof, as shown in Fig. 20a. The thread-laying tube 100 at this time is at one side of and beyond the last needle in the group and the thread Y is extending from the selvage edge of the fabric Z in the slot X direct to the inner end of the tube.

With the clutch 145—150 engaged the first movement of the shaft 20 will cause the tube 100 to traverse the bank of needles 8 from the position at one side of the group of needles, as shown in Fig. 20a, to the full line position at the opposite side of the group of needles 8, as shown in Fig. 21a, the elastic thread Y extending from one side of the fabric Z to the tube at an angle relative to the plane of the fabric Z in the slot X.

The carriage 103 is then in line with one of the arms 110 on the shaft 111. The shaft 111 is then rocked and the tube 100 is thereby moved inwardly from the full position in Fig. 21a to the dotted line position in said figure, whereby the thread Y is placed in parallel relation to the plane of the fabric Z, to form the first elastic strand $Y^1$ in the fabric Z.

The clutch 145—150 is then disengaged and the brake 172 is applied to stop the traversing cam drum 138.

The needles 8 then rise, as shown in Fig. 21, whereupon the shaft 111 is rocked in an opposite direction and the tube 100 is thereby permitted to retract under control of its retracting spring 106, leaving the thread $Y^1$ behind the needles 8, and lying on top of a previously formed course of stitches then hanging on the needles 8 and 9 and by which the previously formed fabric Z is suspended in the slot X between the work plates 6 and 7 on the upper edges of which the said previously formed course of stitches are resting.

The fingers 12—13 are then rocked to the left, as shown in Fig. 22, the said fingers passing between the needles through the alternate spaces therebetween as above noted.

The pattern chains 60, 61 then move to produce a laterally shogging of the finger bars 14 and 15 in opposite directions to the extent of one needle space, as shown in Fig. 22a.

The shaft 17 is then rocked in an opposite direction whereby the fingers 12 and 13 return to a position over the slot X, but through needle spaces adjacent and to the opposite side of the one through which the fingers passed in their initial rocking movement above noted, as shown in Figs. 23, 23a, whereby each of the fingers 12 and 13 has wrapped its individual thread completely around the needle 8 around which it has passed.

The needles 8 then descend as in Fig. 24, and the needles 9 rise as in Fig. 25.

The fingers 12 and 13 move toward each other and line up in the plane which they originally occupied after which they are rocked through the bank of needles 9, as shown in Fig. 26.

After passing through a single space between two adjacent needles in the bank 9, the fingers 12 and 13 are shogged in opposite directions which are also opposite to the directions in which the same fingers moved originally after first passing through the bank of needles 8, see Fig. 26a.

The fingers 12 and 13 are then rocked back through the bank of needles 9, as shown in Fig. 27, whereby the foundation threads carried thereby are wrapped completely around the said adjacently disposed needles respectively.

The fingers 12 and 13 then reassume their original aligned positions and the needles 9 descend as shown Fig. 28.

This completes the tying in of one strand $Y^1$ of the elastic thread Y in the center of the fabric Z, between the two banks of needles 8 and 9.

The clutch 145—150 remains disengaged while the needles 8—9 and fingers 12—13 go through a second series of movements similar to those just described, whereby a second course of stitches is knitted across the elastic thread strand $Y^1$ between the needles 8 and 9.

The clutch 145 is then reengaged and the carriages 103 with their tubes 100 traverse the needles in a direction opposite to that above noted for laying a second strand $Y^2$ of elastic thread in the fabric at a place two courses removed from the first strand, as shown in Fig. 29a.

The carriage 103 is at such time in line with one of the arms 110 on the shaft 111 which is then rocked, thereby projecting the inner end of the tube 100 into a position in line with the fabric Z disposed in the work slot X, to align the newly laid thread with the plane of the fabric intermediate the two banks of needles 8 and 9.

The needles 8 then rise to hold the newly laid thread in place and the tube 100 is again retracted, the clutch 145—150 about this time being again disengaged while the brake 172 is applied to the drum 138.

Another intermediate course of stitches is then formed to complete the laying of two elastic threads $Y^1$ and $Y^2$ in the fabric while four courses of stitches are being formed, said four courses of stitches and the two elastic threads incorporated therein constituting a section A of the fabric.

It will be noted, reference being now had to Fig. 30, that the stitches of these four courses in section A of the fabric have been formed in laterally spaced groups a, c, e, g, each comprising two wales in the fabric, each group being formed on a pair of needles $a^1$, $a^2$; $c^1$, $c^2$; $e^1$, $e^2$; and $g^1$, $g^2$ respectively of the bank 8 and a corresponding pair of needles in the bank 9 located directly behind those of the bank 8.

The finger bars 14—15 are now shogged laterally in opposite directions to an extent equal to half the distance between the groups a—c, or e—g, which corresponds to the distance between two needles of each bank, whereby a finger 12, for example, formerly operating in group c moves left to a position intermediate groups a and c, while the corresponding finger 13 which formerly operated in group c moves right to a position intermediate groups c and e.

Correspondingly the finger 12 formerly operating in group e moves left to the position intermediate groups c and e, now occupied by the finger 13 from group c, and the finger 13 formerly operating in group a moves right to the position intermediate groups a and c.

In other words all the fingers 12 carried by the finger bar 14 move to the left the distance of one needle while all the fingers 13 carried by the finger bar 15 move right a corresponding distance, thereby making new combinations between the fingers which then respectively operate to produce new wale groups, of two needles each, intermediate and tied to the formerly produced groups $a, c, e, g$, etc., such new groups being illustrated as $b, d, f, h$, etc.

The right side needles $a^2$ of group $a$ then become the left side needles $b^1$ of group $b$; the left side needles $c^1$ of group $c$ become the right side needles of $b^2$; the right side needles $c^2$ of group $c$ become the left side needles $d^1$ of group $d$; the left side needles $e^1$ of group $e$ become the right side needles $d^2$ of group $d$; and so on across the machine.

Four courses of stitches are then knit with two strands of elastic thread $Y^3$ and $Y^4$ incorporated therewith in alternate courses respectively, to form section B of the fabric Z.

The section B and each succeeding section C, D, E, etc., which, together with section A, constitute one complete designing cycle of the machine, are knit in the same manner as the section A, including the operation of the traversing mechanism by which the elastic strands $Y^1$, $Y^2$, $Y^3$, $Y^4$, $Y^5$, $Y^6$, $Y^7$, $Y^8$, $Y^9$, $Y^{10}$ are laid in the fabric.

After completing section B the finger bars 14—15 move further to the left and right respectively to form wale groups in section C in vertical alignment with the wale groups in section A.

After completing section C the finger bars 14—15 then reverse their shogging movement, the bar 14 then moving to the right while the bar 15 moves to the left, to form the wale groups of section D in vertical alignment with the wale groups in section B.

After completing section D the finger bars 14 and 15 move further to the right and left respectively to form wale groups of section E in vertical alignment with the wale groups of sections A and C.

This completes one designing cycle of the machine which is repeated indefinitely throughout the formation of the fabric presenting the appearance depicted in Fig. 31.

The effect depicted in Fig. 31 is primarily produced by the wale groups being drawn out of strictly vertical lines by reason of the shogging to the left and right of the finger bars 14 and 15 and is further enhanced by the use of foundation threads of different characters, such as double "ratonet" in two fingers and "rayon" in the next two fingers, and so on in this manner across the machine, which in the finished fabric produce the diagonal crossed line or diamond effect composed of "ratonet" with "rayon" centers, or vice versa.

Obviously, other designs using materials other than those noted may be used without departing from the spirit of the invention. It will also be quite obvious that by changing the relation of the high, low and/or intermediate links in the pattern chains 60 and 61 such variations of design as may be desired may be readily accomplished; and that by changing the high and low portions 155a and 155b of the clutch control element 155, the traversing mechanism may be operated at any predetermined time to insert elastic threads at the desired courses.

As shown in Figs. 30, 31, 32 and 33, the fabric Z is composed of two substantially similar faces $Z^1$ and $Z^2$ between which are disposed the elastic weft threads Y. The elastic wefts Y are tied and held in place against movement relative to the fabric by warp threads W, $W^1$, which, as shown in Fig. 33, each form a stitch S in one course, and in one wale on one face of the fabric, and then cross the wefts Y in the center of the fabric and form a stitch $S^1$ of the same said course but in an adjacent wale and on the opposite face of the fabric, the two adjacent wales in each instance, between which each warp operates, constituting one of the wale groups $a, b, c, d$, etc., in the fabric sections A, B, C, D, etc. The passing of the warp threads W, $W^1$ from one to the other of adjacent wale groups in adjacent fabric sections effects a tying of the wale sections together, thereby forming the complete fabric which will be elastic both walewise and coursewise of the fabric.

As shown in Figs. 32 and 33, the elastic thread preferably comprises a rubber core thread and an outer thread of any desired material wound in closely adjacent relation to each other for covering the rubber core without materially affecting the longitudinal elasticity of the composite elastic threads Y, so formed.

Of course, the various mechanical and other novel features specifically shown and described can be changed and modified in various ways without departing from the invention herein disclosed and hereinafter claimed.

I claim:

1. The combination of a bank of needles, a weft-laying guide adapted to traverse said needle bank, a rotatable cylinder having a peripheral cam groove, a slide guided for longitudinal movement parallel to the axis of said cylinder, a cam follower carried by said slide and disposed in the cam groove of said cylinder, an oscillating drum, rack and pinion means operably connecting said slide with said drum, and means operably connecting said drum with said guide including a flexible element encircling said drum for effecting needle traversing movements of said guide upon rotation of said cylinder.

2. The combination of a bank of needles, a weft-laying guide adapted to traverse said needle bank, a rotatable cylinder having a peripheral cam groove, a slide guided for longitudinal movement parallel to the axis of said cylinder, a cam follower carried by said slide and disposed in the cam groove of said cylinder, an oscillating drum, rack and pinion means operably connecting said slide with said drum, a flexible element having a portion disposed and guided in parallel relation to said needle bank and another portion encircling said drum for moving said element longitudinally upon rotation of said cylinder, and means for securing said guide to said first portion of said flexible element for traversing said needle bank.

3. The combination of a bank of needles, a weft-laying guide adapted to traverse said needle bank, a rotatable cylinder having a peripheral cam groove, a slide guided for longitudinal movement parallel to the axis of said cylinder, a cam follower carried by said slide and disposed in the cam groove of said cylinder, an oscillating drum, rack and pinion means operably connecting said slide with said drum, a flexible element having a portion disposed and guided in parallel relation to said needle bank and another portion encircling said drum for moving said element longitudinally upon rotation of said cylinder, a carriage for said guide secured to said parallel portion of said flexible element, and means for moving the guide relative to said carriage in a direction transversely to said flexible element from the operating plane of said element to the plane of said needle bank.

4. The combination of a bank of needles, a weft-laying guide adapted to traverse said needle bank, a rotatable cylinder having a peripheral cam groove, a slide guided for longitudinal movement parallel to the axis of said cylinder, a cam follower carried by said slide and disposed in the cam groove of said cylinder, means operably connecting said slide with said guide for effecting needle-traversing movements of said guide upon rotation of said cylinder, a power shaft, a clutch operably connecting said cylinder to said shaft, and selective control means for controlling the clutch to effect traversing of said needles by said guide during the formation of predetermined courses of stitches by said needles.

5. The combination of a bank of needles, a weft-laying guide adapted to traverse said needle bank, a rotatable cylinder having a peripheral cam groove, a slide guided for longitudinal movement parallel to the axis of said cylinder, a cam follower carried by said slide and disposed in the cam groove of said cylinder, means operably connecting said slide with said guide for effecting needle-traversing movements of said guide upon rotation of said cylinder, a power shaft, a clutch operably connecting said cylinder to said shaft, selective control means for controlling the clutch to effect traversing of said needles by said guide during the formation of predetermined courses of stitches by said needles, and a brake for said cylinder operable by said shaft upon release of said clutch by said selective control means.

6. The combination of a bank of needles, a guide adapted to lay a weft thread to said needles, a pair of pinch rolls arranged to draw said thread from a source of supply and to feed said thread to said guide devoid of tension, a shaft to which one of said rolls is secured, a constant speed friction disc disposed in a plane substantially parallel to the axis of said shaft, a frame movable bodily in a plane substantially perpendicular to the plane of said disc and in which said shaft is rotatably mounted, a friction pinion carried by and splined to said shaft for movement radially to the axis of said disc, and resilient means pressing said frame toward said disc to maintain driving contact between the pinion and the disc.

7. The combination of a bank of needles, a guide adapted to lay a weft thread to said needles, a pair of pinch rolls arranged to draw said thread from a source of supply and to feed said thread to said guide devoid of tension, a shaft to which one of said rolls is secured, a constant speed friction disc disposed in a plane substantially parallel to the axis of said shaft, a frame movable bodily in a plane substantially perpendicular to the plane of said disc and in which said shaft is rotatably mounted, a friction pinion carried by and splined to said shaft for movement radially to the axis of said disc, resilient means pressing said frame toward said disc to maintain driving contact between the pinion and the disc, a screw shaft mounted in said frame parallel to said pinion-carrying shaft, a nut threaded on said screw shaft, a projection on said nut engaging and holding said pinion in predetermined position on said pinion-carrying shaft, and means for rotating the screw shaft for sliding the pinion longitudinally of said pinion-carrying shaft.

8. The combination of a bank of needles, a weft-laying guide for traversing the needle bank, a rotatable cylinder having a peripheral cam, a follower for movement by the cam for translating the rotative movement of the cylinder into other movement, means for constraining the cam follower to pursue said other movement, an oscillatory drum, motion translating means connecting the cam follower to the drum, and means connecting the drum to the guide including a flexible element cooperating with the periphery of the drum for effecting needle traversing movements of the guide in response to rotation of the cylinder.

9. The combination of a bank of needles, a weft-laying guide for traversing the needle bank, a rotatable cylinder having a peripheral cam, a follower for positive movement in opposite directions by the cam for translating the rotative movement of the cylinder into other movement, means for constraining the cam follower to pursue said other movement, an oscillatory drum, motion translating means connecting the cam follower to the drum, and means connecting the drum to the guide including a flexible element cooperating with the periphery of the drum for effecting needle traversing movements of the guide in response to rotation of the cylinder.

FREDERIC W. PLUMB